(12) United States Patent
Khawand et al.

(10) Patent No.: US 6,765,888 B2
(45) Date of Patent: Jul. 20, 2004

(54) CONTROL PDU FOR EARLY TARGET PAGING FOR PACKET DATA MODES

(75) Inventors: Charbel Khawand, Miami, FL (US); Chin Pan Wong, Coral Springs, FL (US)

(73) Assignee: Motorola, Inc., Schaumburg, IL (US)

(*) Notice: Subject to any disclaimer, the term of this patent is extended or adjusted under 35 U.S.C. 154(b) by 24 days.

(21) Appl. No.: 10/227,116

(22) Filed: Aug. 23, 2002

(65) Prior Publication Data

US 2004/0037304 A1 Feb. 26, 2004

(51) Int. Cl.7 ............................................. H04Q 7/00
(52) U.S. Cl. ........................ 370/329; 455/435; 455/455
(58) Field of Search ................................ 370/310, 328, 370/331, 313, 335–8, 348, 433, 432, 437, 441, 442, 445, 462–3, 230; 455/403, 422, 435, 455, 458, 464; 340/7.1, 7.2, 7.21, 7.23, 7.22, 7.24–7.62

(56) References Cited

U.S. PATENT DOCUMENTS

| | | | | |
|---|---|---|---|---|
| 5,873,033 A | * | 2/1999 | Hjern et al. | ................. 455/417 |
| 6,134,439 A | * | 10/2000 | Sipila et al. | ................. 455/436 |
| 6,278,880 B1 | * | 8/2001 | Sipila et al. | ................. 455/436 |
| 6,324,564 B1 | | 11/2001 | Thielke et al. | |
| 6,421,714 B1 | | 7/2002 | Rai et al. | |
| 6,424,679 B1 | | 7/2002 | Dabak et al. | |
| 2002/0042270 A1 | * | 4/2002 | Yi | ............................... 455/424 |
| 2003/0157927 A1 | * | 8/2003 | Yi et al. | ...................... 455/411 |

* cited by examiner

*Primary Examiner*—David Vincent
(74) *Attorney, Agent, or Firm*—Scott M. Garrett

(57) ABSTRACT

The invention relates to a system and method for use in wireless packet data mode communications for enabling communication between a source device (102a) and one or more target devices (102b) with a reduced set-up time. The invention captures in a control structure (600), one or more communication parameters (602–608) during the set up of the source device (102) and a base station (106). Then the control structure (600) is transmitted to the one or more target devices (102b) during the period of the source device's (102a) configuration and is utilized to configure the one or more target devices (102b) to communicate with the source device (102a) via the base station (106), thus reducing the total time required to set-up the communications.

8 Claims, 5 Drawing Sheets

TOTAL TIME:-5.3

CONTROL PDU FOR EARLY TARGET PAGING FOR PACKET DATA MODES

FIELD OF THE INVENTION

The invention relates to wireless system communications. More particularly, the invention relates to the reduction of the set-up time for remote units utilizing packet data as opposed to switched data to communicate with a base station.

BACKGROUND OF THE INVENTION

The wireless industry has grown at a tremendous pace over the past few years. Wireless communication has become a standard part of every day life. Most people utilize some derivative form of wireless communications such as Global System for Mobile communication (GSM), Universal Mobile Telecommunications System (UMTS), Carrier Detection Multiple Access (CDMA) and 802.11 in various aspects of daily living.

Generally, radio systems are designed for a certain area of coverage or footprint. These areas are generally referred to as cells. Cells enable the reuse of similar frequencies by multiple sources to support services in metropolitan areas that are some distance apart. The geographic size of cells are not necessarily consistent throughout a given area and may vary due to frequency and power level, topography of the area, time of day and so forth. Communications within these cells take advantage of a concept known as Demand Assigned Multiple Access (DAMA). DAMA enables multiple devices to access a network in a shared manner on a demand basis. Basically, devices access the network on a first come, first serve basis. Within a wireless network, there are a number of ways in which multiple access can be provided to end-users. At the most basic level, there is a Frequency Division Multiple Access (FDMA) methodology, which is essentially the starting point for all wireless communications, given that each cell must be separated by frequencies to avoid interferences among wireless devices. FDMA divides assigned frequency ranges into multiple carrier frequencies in order to support multiple conversations.

Another method that is utilized in wireless networking is the Time Division Multiple Access (TDMA), which is a digital technique that divides each frequency channel into multiple time slots. Each of the time slots within a frequency channel supports an individual device conversation. Generally speaking, services based on TDMA offer roughly three times the traffic capacity of FDMA services.

Yet another communication methodology, which is relatively new and has its root in spread spectrum radio is known as Code Division Multiple Access (CDMA). Spread spectrum radio spreads the bandwidth of a transmitted signal over a spectrum of radio frequencies. The combined spectrum of radio frequencies is usually much wider than what is required to support the narrow band transmission of the signal. Spread spectrum uses two techniques namely, Direct Sequence (DS) and Frequency Hopping (FH). In brief, direct sequence spread spectrum is a packet radio technique in which the narrow band signal is spread across a wider carrier frequency band. In other words, the signal information is organized into packets, each of which is transmitted across a wider carrier band frequency in a redundant manner i.e. packets are sent more than once. Multiple transmissions can then be supported. The transmissions from specific terminals are identified by a unique code such as, a 10 bit code that is pre-pended to each data packet. Frequency Hopping Spread Spectrum is generally preferred over direct sequence spread spectrum. FHSS involves transmission of short bursts of packets within the wide band carrier over a range of frequencies. Essentially, the transmitter and receiver hop from one frequency to another in a choreographed hop sequence and a number of packets are sent to each frequency. The hop sequence is controlled by a centralized base station antennae.

Regardless of the communication methodology for a given network, a certain amount of pre-configured set-up and real time set-up of communication devices will be required. One such requirement for communication between a remote/mobile unit and a base station is the set-up and configuration of certain communication parameters. For example, with packet data mode communications data rate, availability and maximum delay time for each packet communication must be set-up and negotiated between the remote unit and the base. Generally, this negotiation and configuration occurs in real time at the moment when the remote unit first initiates a communication session with the base station. These negotiation and configuration events usually take place in a serialized format, meaning there is an initial sequence of events that occur between an initiating mobile device and a base station, followed by a similar sequence of events between the base station and a target mobile device. These sequence of events entail a process wherein each request or command from one device must first be responded to by the second device before other subsequent requests or commands take place between the devices. Furthermore, all such communication between the first mobile device and the base station must be completed before similar communications occur between the base station and the target mobile device.

In particular, packet mode capable user equipment request data sessions from their serving infrastructure nodes such as the base station by means of signaling negotiations. Essentially, a signaling channel has to be established and authenticated with the base station system in order for a service to be established between the mobile unit and the base. A certain amount of time delay is associated with the signaling from the initiating mobile unit, the authentication by the system and the negotiation of a certain quality of service. This time delay phenomena is further exaggerated when a first mobile unit attempts to communicate with a second mobile unit or paged target. In such an instance, the paged target or second mobile unit will go through the same set-up and negotiation procedure in order to establish a link with the base station system, thus resulting in a lengthy set-up time.

A reduction in the set-up time will result in quicker communications and ultimately a reduction in the amount of time for which a particular communication frequency is tied up. The importance of reducing this time can be quite dramatic depending on the mobile unit application. For instance, a dispatch unit that needs to communicate with multiple mobile units would benefit greatly from a reduced set-up time in reaching the targets. As such, there exists a need to provide a system and method to reduce the time and set-up procedures for communication between an initiating mobile unit and other target mobile units.

BRIEF SUMMARY OF THE INVENTION

The invention relates to a system and method for use in wireless packet data mode communications, for enabling communication between a source device and one or more target devices by capturing in a control structure, one or more communication parameters during the set up of the source device and a base station. The set-up involves a series of interactive and sequenced communications between the source device and the base station. The invention involves the transmitting of the control structure to the one or more target devices and utilizing the control structure to contemporaneously configure the one or more target devices so that the target devices can communicate with the source device via the base station. One of the advantages of the invention is the reduction in set-up time for remote units.

DETAILED DESCRIPTION OF THE INVENTION

The invention provides a unique system and method for setting up and establishing communication between remote units and a base station. The invention is applicable in wireless communication devices that utilize packet data modes for paging or chatting.

Figure 1:
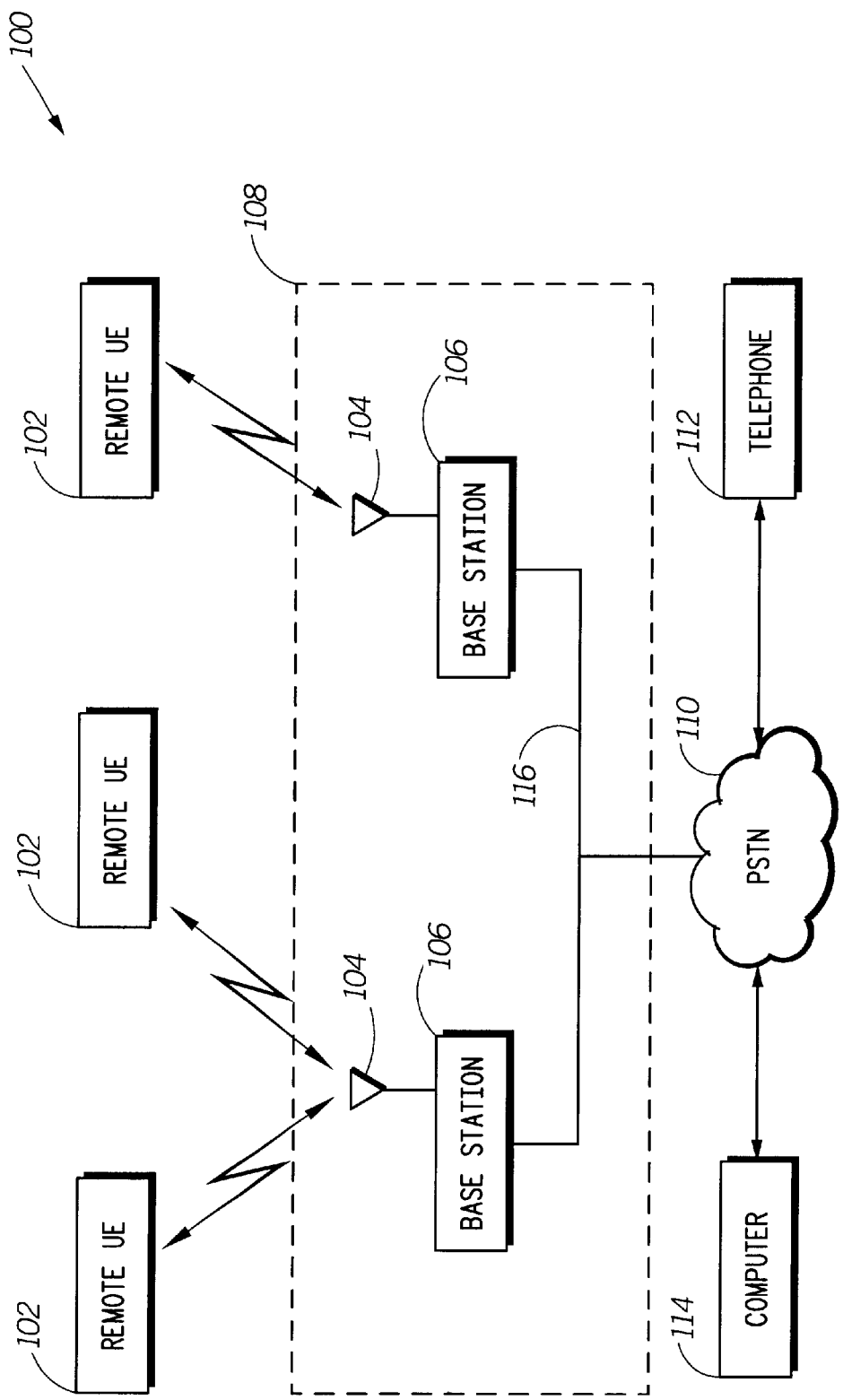
FIG. 1 is a block diagram of an exemplary wireless communication system in which the invention can be practiced.

Referring initially to FIG. 1, a blocked diagram illustrates a wireless communication system, environment in which the invention can be practiced. As shown, a fixed portion 108 includes one or more base stations 106, which provide communication to a plurality of remote user equipment 102. The base stations 106 coupled by communication link 116 preferably communicates with the user equipment 102 utilizing conventional radio frequency techniques. One or more antennae 104 provide communication from the base stations 106 to the remote user equipment 102. The base stations 106 preferably also receive RF signals from the plurality of remote user equipment units 102 via antennae 104. In an embodiment of the invention messages communicated between base station 106 and remote user equipment 102 comprise a selective addressing scheme to identify the initiating or target device. Information exchanged between base station 106 and remote user equipment 102 can include data messages, commands and adjustments to operating parameters for the communication system. Also transmitted between remote user equipment 102 and base stations 106 are responses to scheduled messages, positive acknowledgments (ACKS), negative acknowledgments (NAKS), and unscheduled messages such as registration requests and requests for items of information. It will be appreciated by those skilled in the art that other methods and schemes for wireless communication may be utilized to communicate between the base station 106 and the remote user equipment 102, or between multiple remote user equipment 102. Such methods are contemplated by and are within the scope of the invention.

The fixed portion 108 of the communications network 100 is coupled to a public switch telephone network (PSTN) 110 for receiving and sending messages to other device types like telephone 112 and computer 114. Calls or information initiated by or destined for a remote user equipment 102 can be received by or originated from a device such as telephone 112 or computer 114. Those skilled in the art recognize that alternate types of networks, for example, local area networks (LAN), wide area networks (WAN) and the Internet, can be used for receiving or sending selective call information to the wireless network 100. A computer such as computer 114 can also serve as a central repository for various applications and information utilized by the wireless communication system.

It will be further appreciated that the invention is applicable to other types of wireless communication systems including dispatch systems, cellular telephone systems and voice and/or data messaging systems. A remote communication unit that can be utilized in the invention will be discussed with reference to FIG. 2.

Figure 2:
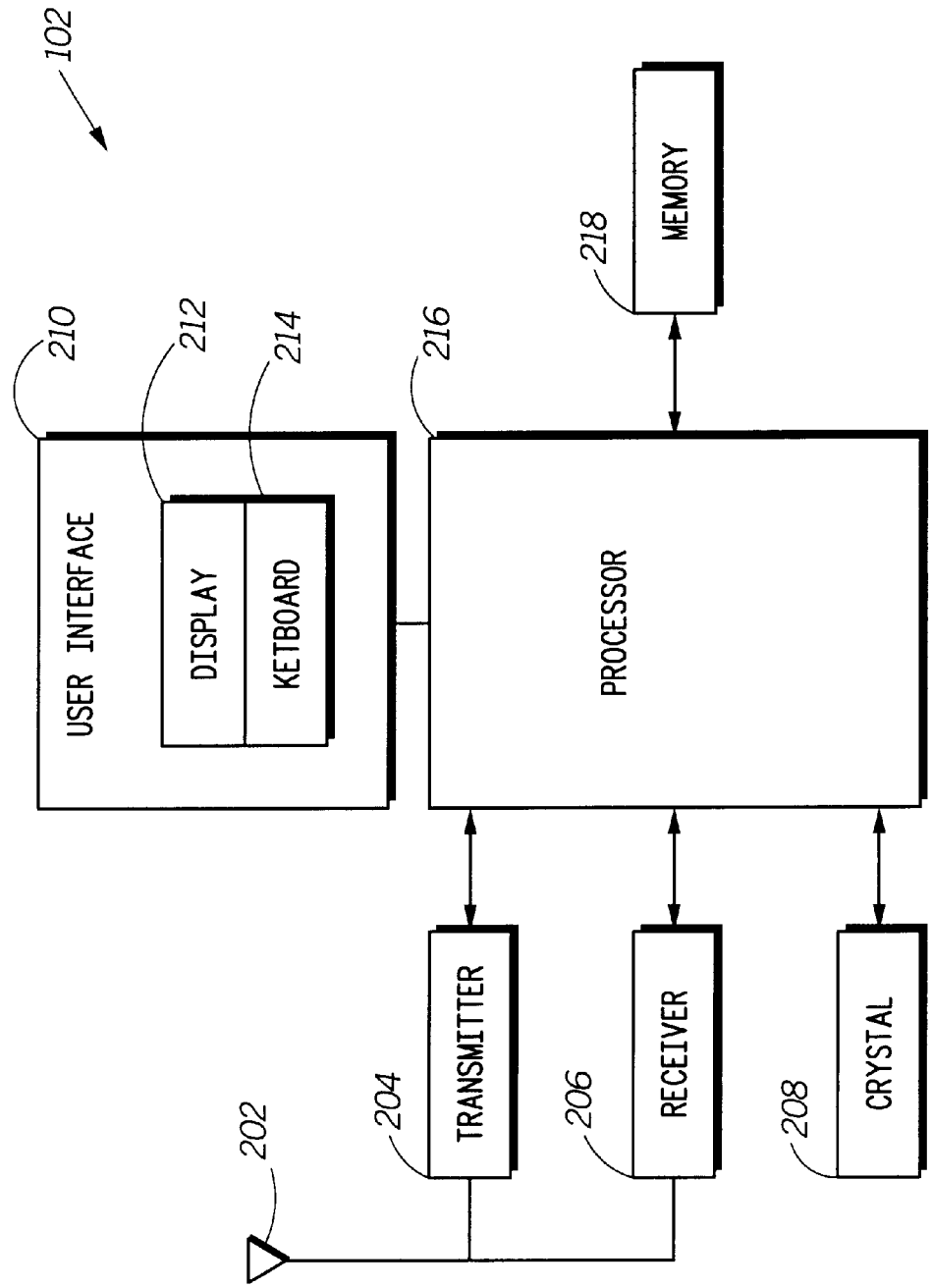
FIG. 2 is an electrical blocked diagram of an exemplary remote unit in accordance with the invention.

FIG. 2 illustrates an exemplary remote user equipment 102 and its various components. The remote user equipment 102 comprises an antennae 202 that is utilized for receiving inbound messages and for transmitting outbound messages. The antennae 202 is coupled to a transmitter 204 and a receiver 206. Both the transmitter 204 and the receiver 206 are coupled to a processor 216 for processing information relating to outbound and inbound messages and for controlling the remote user equipment 102 in accordance with the invention. A user interface 210 is operably coupled to the processor 216 for providing user interaction and feedback. In an embodiment of the invention, the user interface 210 comprises a display 212 and a keyboard 214. The display 212 provides a user with operative information and feedback from the processor 216. The keyboard 214 enables a user to provide input or response to the processor 216. Other methods and systems for user interaction and feedback could also be used to accomplish the objects of the invention. A crystal oscillator 208, provides conventional timing to the processor 216 and other components of the remote user equipment 102. Processing is performed by the processor 216 in conjunction with memory 218. The memory 218 comprises software instruction and data for programming and operating the remote user equipment 102 in accordance with the invention. Remote user equipment 102 operates to communicate to a base station 106. Such operation will be discussed in detail with reference to FIGS. 3, 4A, 4B and 5.

For purposes of illustration, explanation and not limitation, the invention will be discussed with reference to the UMTS environment. The invention is equally applicable and capable to be utilized in any wireless communication strategy or methodology.

Figure 3:
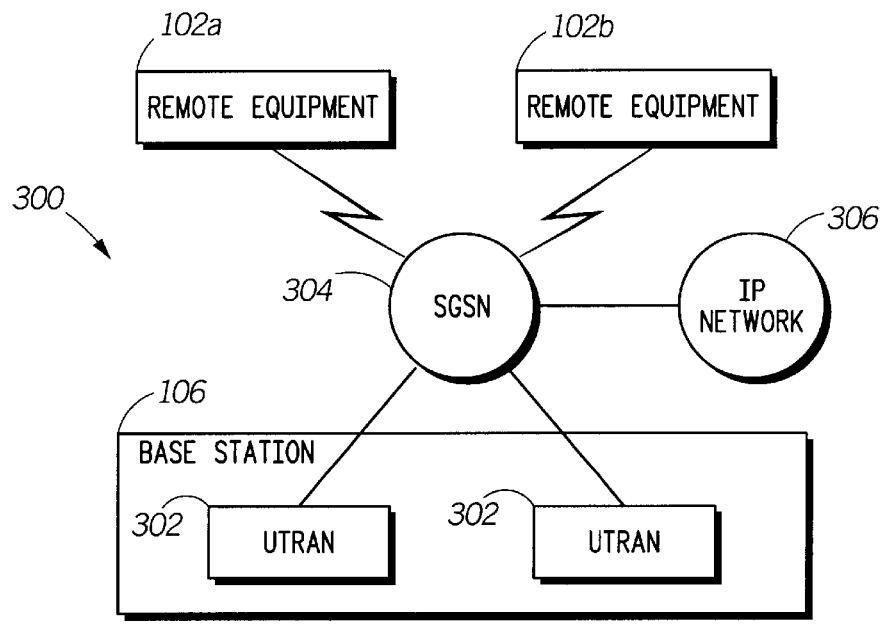
FIG. 3 is a block diagram of the service level communications on a typical wireless network.

A brief overview of the UMTS environment will be discussed with reference to FIG. 3. As shown in FIG. 3, a base station 106 comprises one or more UMTS Terrestrial Radio Access Network (UTRAN) components 302. As previously mentioned, UMTS is a packet mode communication scheme. As such, there exists a General Packet Radio Service (GPRS) that provides the environment for communication between remote user equipment 102 and base station 106. GPRS provides packet routing and gateway services through a Serving GPRS Support Node (SGSN) 304. SGSN is positioned to communicate between remote user equipment 102 and UTRAN 302 of a base station 106. SGSN 304 also provides connection and communication to an IP network 306.

In operation, a remote user equipment 102 negotiates with SGSN 304 for the quality of service that will be utilized in the communication with UTRAN 302 of the base station 106. Quality of service includes such things as data rate for communications, availability, maximum time delay for packet communications and so on. The quality of service negotiation involves multiple bidirectional communications between remote user equipment 102 and base station 106 devices. The nature of these device communications and the types of messages that are exchanged will be discussed further with reference to FIGS. 4A and 4B.

Figure 4A:
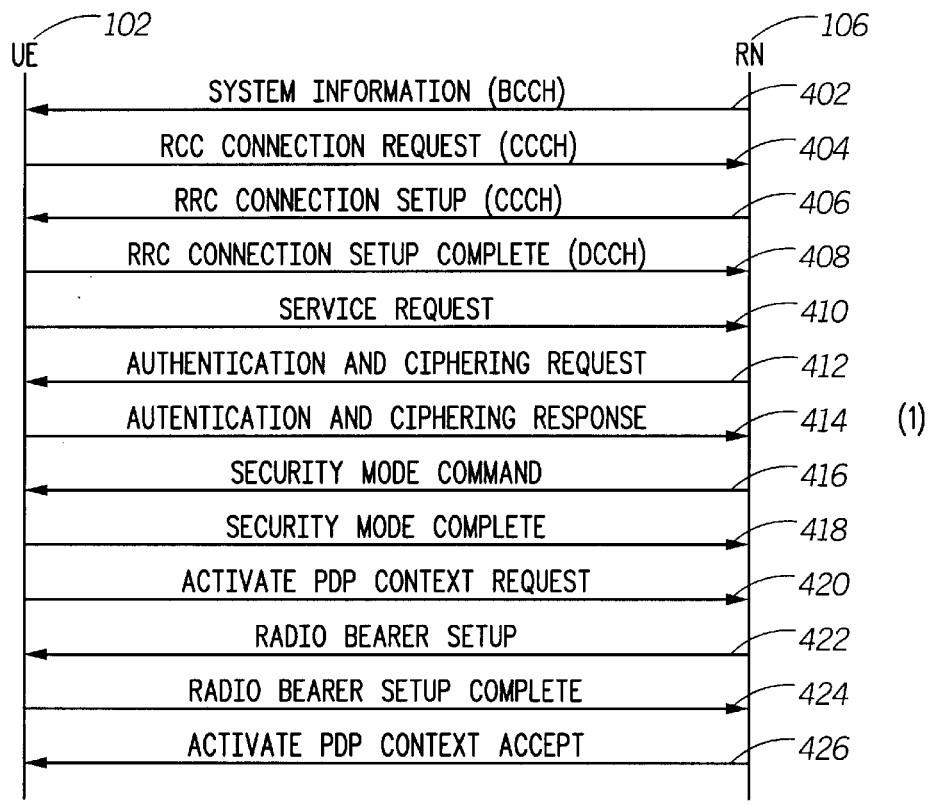
FIG. 4A is a flow diagram representing the communications initiated by a remote unit to a base station.
Figure 4B:
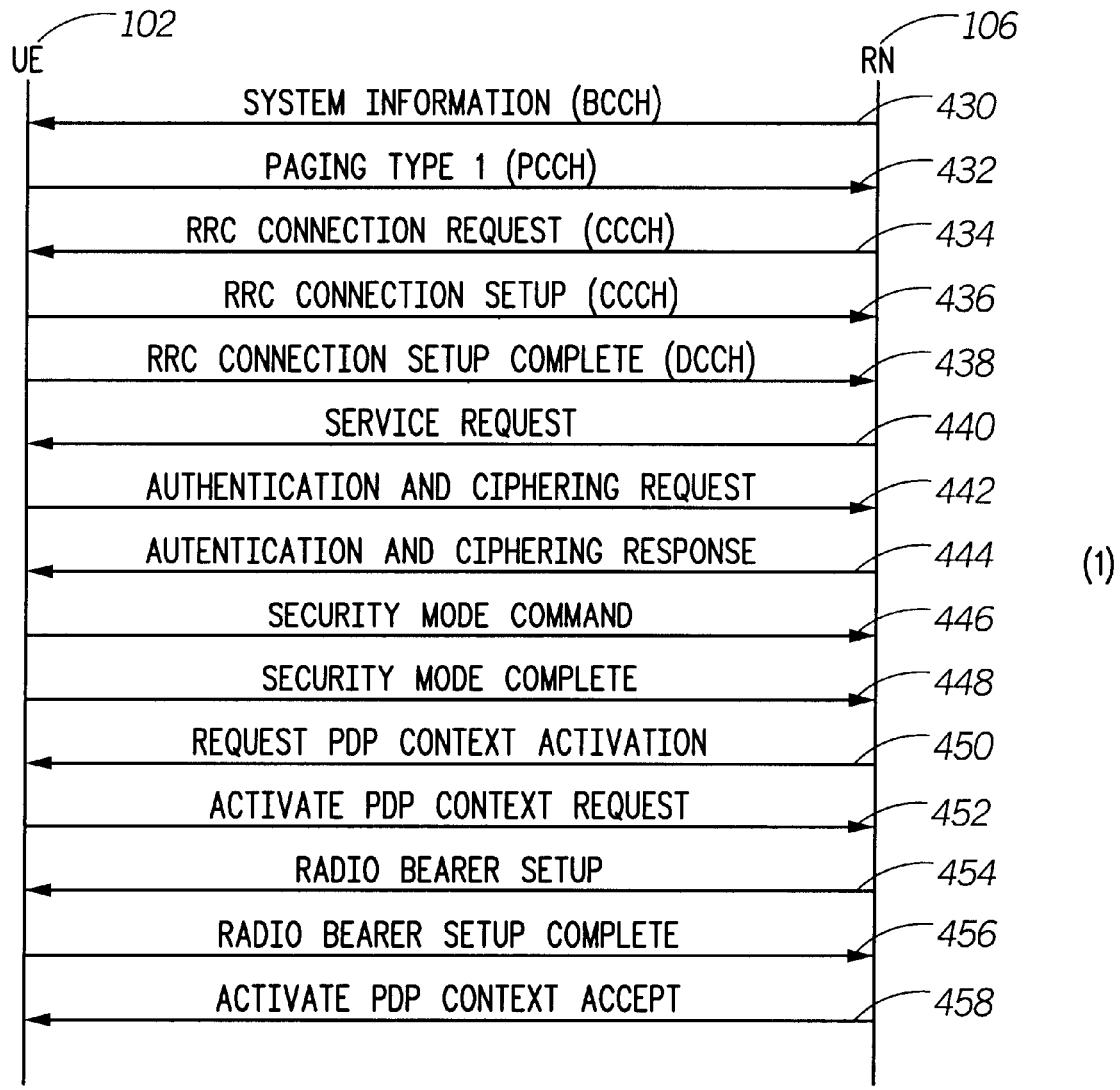
FIG. 4B is a flow diagram of the communication initiated by a base to a target remote unit.

Turning to FIGS. 4A and 4B, the steps for an initiating remote user equipment 102 to communicate via a base station 106 to a paged/receiving second remote user equipment 102 are illustrated. As discussed earlier, a certain amount of negotiation must take place between both the initiating and receiving user equipment 102 and the base station 106. This negotiation takes time, because not only will the initiating target undergo a negotiation process, the paged target will also undergo the same process, thus doubling the total time required to connect the two remote user equipments 102 to each other. Although this time may not be a problem for a remote computer user dealing with data, in the case of a remote voice user it adds to the total set-up time required for a particular service and produces noticeable delays.

FIG. 4A illustrates the message flow between a base system 106 and a source or initiating user equipment 102. FIG. 4A also illustrates the serialized nature of the message flow from the moment the user equipment 102 initiates a packet data page until a time when the base station 106 has received the first Packet Data Unit (PDU). In general, system information and other relevant data is communicated to remote equipment such as user equipment 102 on an ongoing basis, this is represented as step 402. In an embodiment of the invention the user equipment 102 includes a Press To Talk (PTT) button, which serves to initiate communications or paging services to the wireless network. The activation of PTT causes a connection request such as shown at step 404, to be initiated from user equipment 102 to the base station 106. In response, base station 106 acknowledges such requests with a connection set-up signal at step 406. This signals the user equipment to begin a set-up process, the completion of which prompts a connection set-up complete signal from user equipment 102, at step 408. The completion signal is also simultaneously followed by a service request from user equipment 102 to base station 106 at step 410. In response, base station 106 performs an authentication and ciphering request at step 412, to which the user equipment 102 responds at step 414. Following this, a security mode command is forwarded at step 416 to user equipment 102. The command results in a response signal to indicate the completion of the security mode, at step 418. Once security negotiations are complete, a request is initiated by user equipment 102 at step 420 to activate the PDP context on the base station 106. This is followed by a radio bearer set-up method from the base station 106 to the user equipment 102, at step 422. The radio bearer set-up completion is signaled back at step 424. The receipt of the radio bearer set-up completion causes the base station 106 to accept the activation of the PDP context and a confirmation of the acceptance is sent to the user equipment 102 at step 426. The conclusion of this mobile originated packet data session that was started by the initiating user equipment 102, prompts the start of a subsequent packet data session from base station 106 to the target user equipment 102. In other words, a mobile terminated packet data session is originated by the base station 106 to a target user equipment 102. The process of this data session will be discussed with reference to FIG. 4B.

As shown in FIG. 4B, the base station 106 transmits system information to a target mobile user equipment 102 at step 430. The base station 106 also transmits paging type information at step 432 to the target user equipment 102. This is then followed by the target user equipment 102 initiating a connection request to the base station at step 434. From this point on, the steps and the nature to communication between the target user equipment 102 and the base station 106 is identical to that of the initiating user equipment and base station which was previously described with reference to FIG. 4A, in other words, steps 434 through 458 in FIG. 4B are identical to steps 404 through 426 in FIG. 4A i.e. a repetitive process. This repetitive process is alleviated by the system and method of the invention. Information that results from the initial communication between the initiating user equipment 102 and base station 106, is utilized for subsequent communication from base station 106 to a target user equipment 102. This process of reusing information will be discussed with reference to FIG. 5.

Figure 5:
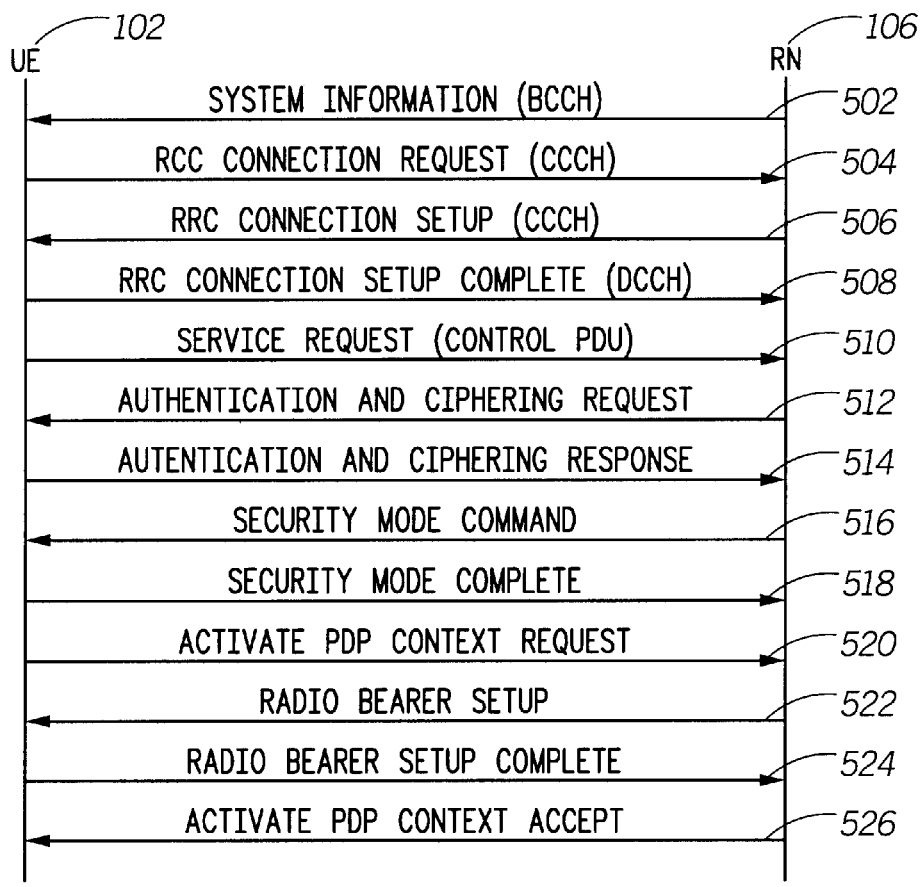
FIG. 5 is a flow diagram representing the communication from a mobile unit to a base in addition to the creation of a control packet data unit according to the method of the invention.

FIG. 5 illustrates a proposed change to the process flow for the initial set-up of user equipment 102a and utilizes a control PDU which contains information that is ultimately sent from the base station 106 to a target user equipment 102b. The set-up process for the initiating user equipment 102a is identical in nature and duration to the set-up process that was discussed with reference to FIG. 4A. In other words, steps 502 through 526 are identical to the previously discussed steps 402 through 426. In an embodiment of the invention execution of steps 502–506 take approximately 5.3 seconds. As previously discussed, steps 502 to 526 and steps 402 to 426 provide set-up for the initiating user equipment 102a and are communicated to the base station 106. The base station 106 must then communicate to and set-up a target user equipment 102b as discussed with reference to FIG. 4B which take approximately 5.5 seconds i.e. steps 430 through 458. As such, the cumulative total time for setting up communications between an initiating user equipment 102a and a target user equipment 102b would be approximately 10.8 seconds. The method of the invention provides a way to significantly reduce the set-up time. This is done by paging a target user equipment 102b as soon as the initiating user equipment 102a expresses a need to communicate with such target rather than waiting until the set-up of the initiator is complete. This initial communication to the target occurs during the set-up process of the initiating user equipment 102a. In other words, early in the set-up process of the initiator, the initiator informs the base station of its intent to page a particular target. While the initiator is being set-up, the system locates the target and begins to set the target up for a dispatch session. The method of the invention reduces total set-up time by creating a control PDU during the set-up session of the initiating user equipment 102a. The details of the content of a control PDU will be discussed with reference to FIG. 6 later on in this document. Returning to FIG. 5, the activation of the PDP context at step 526 initiates the sending of a PDU to the paged target user equipment 102b by the base station 106. The content of the control PDU is utilized by the method and system of the invention to set-up the radio bearer service and other parameters of the target user equipment 102b. In other words, the need for the prolonged negotiation between base station 106 and the target user equipment 102b is eliminated, thus reducing set-up time.

In order to facilitate this information exchange using the control PDU, a certain structure which is known to both sides of the communication is required.

Figure 6:
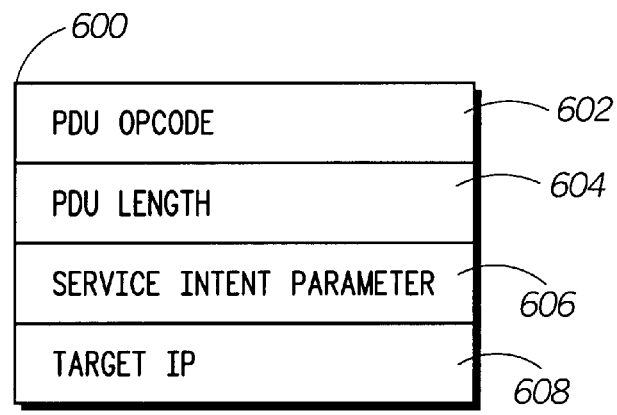
FIG. 6 illustrates an exemplary structure for a control packet data unit.

An exemplary PDU structure is shown and discussed with reference to FIG. 6 and generally referenced as 600. While this illustrated PDU control structure 600 contains certain specific parameters, it will be understood by those skilled in the art that other structures, formats and parameters could be utilized to achieve the same results. In an embodiment of the invention, the control PDU structure 600 contains a PDU operation code 602, a PDU length 604, a service intent parameter 606 and a target IP 608. A PDU with this structure is built and sent early in the configuration process of an initiating user equipment to inform a target device of the intent of the initiator to make contact with that target device. The PDU operation code 602 identifies the step in the set-up process, the PDU length 604 identifies the total length of the PDU control structure, the service intent parameter 606 then contains the information that is associated with a particular operation code and the target IP uniquely identifies the target user equipment 102b.

As would be understood by those skilled in the art, functions discussed as being performed on the user equipment 102a, 102b or the base station 106 could be performed on any one or more of those systems, in a variety of combinations and configurations, and such variations are contemplated and within the scope of the invention.

The invention has been described in relation to particular embodiments which are intended in all respects to be illustrative rather than restrictive. Alternative embodiments will become apparent to those skilled in the art to which the invention pertains without departing from its scope.

From the foregoing, it will be seen that this invention is one well adapted to obtain all of the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

We claim:

1. A method for use in wireless packet data mode communications for enabling communication between a source device and one or more target devices comprising:

configuring one or more communication parameters on said source device and a base station by engaging in a series of interactive and sequenced communications between said source device and said base station;

capturing said one or more communication parameters in a control structure;

transmitting said control structure to said one or more target devices;

utilizing said control structure to configure said one or more target devices to communicate with said base station; and communicating between said source device and said one or more targets devices via said base station.

2. The method as recited in claim 1, wherein said control structure is transmitted to said one or more target devices prior to the complete configuration of said source device.

3. The method as recited in claim 1, wherein said control structure is a packet data unit.

4. The method as recited in claim 1, wherein the communication is enabled within a set-up time duration that is less than the time that is involved with individually configuring the source device and the one or more target devices to communicate with the base station.

5. The method as recited in claim 1, wherein said wireless packet data mode communications is UMTS.

6. The method as recited in claim 1, wherein said communication is the paging of said one or more target devices.

7. The method as recited in claim 1, wherein said communication is chatting between said source device and said one or more target devices.

8. A method for use in wireless packet data mode communications for setting up a first remote user device comprising:

negotiating one or more parameters for communicating between a base station and a second remote user device; and transmitting said one or more parameters to said first remote user device for use in configuring corresponding communication settings on said first remote user device;

wherein said transmitting of said one or more parameters occurs prior to the completion of the negotiation between said base station and said second remote user device, to enable faster setup of said first remote user device.

* * * * *